April 2, 1963

L. R. MAST 3,084,240

ELECTRIC BASEBOARD HEATERS

Filed Jan. 29, 1960

LOWELL R. MAST
INVENTOR.

BY
BLAIR, SPENCER & BUCKLES
ATTORNEYS.

April 2, 1963  L. R. MAST  3,084,240
ELECTRIC BASEBOARD HEATERS
Filed Jan. 29, 1960  3 Sheets-Sheet 2
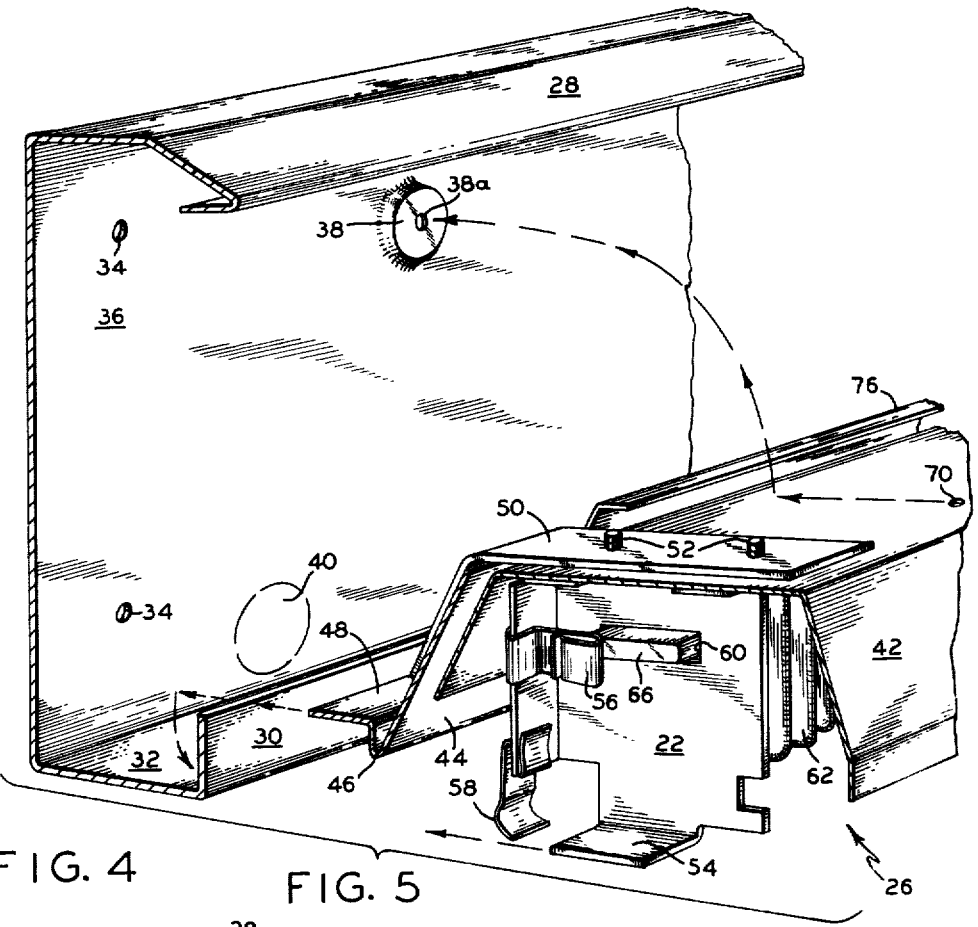
FIG. 4  FIG. 5
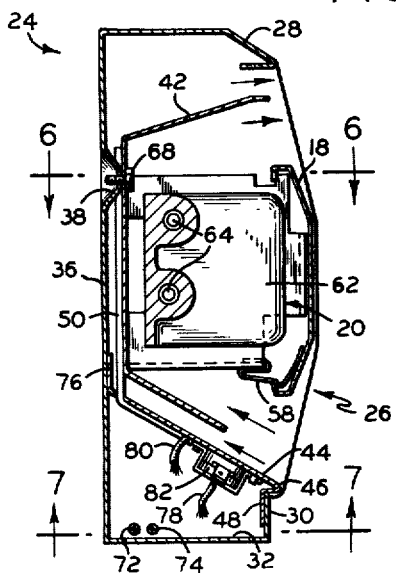
LOWELL R. MAST
INVENTOR.
BY
BLAIR, SPENCER & BUCKLES
ATTORNEYS.

April 2, 1963
L. R. MAST
3,084,240
ELECTRIC BASEBOARD HEATERS
Filed Jan. 29, 1960
3 Sheets-Sheet 3
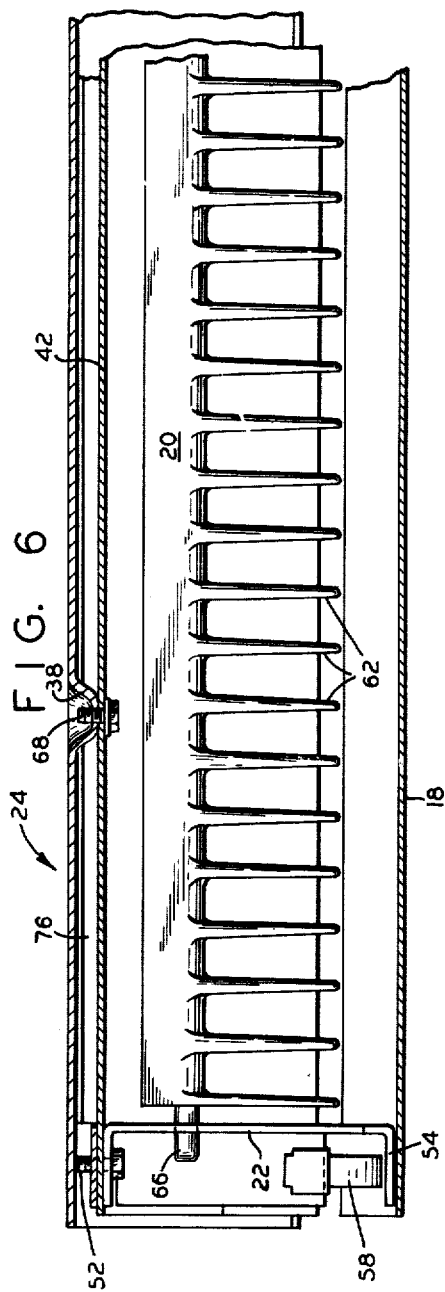
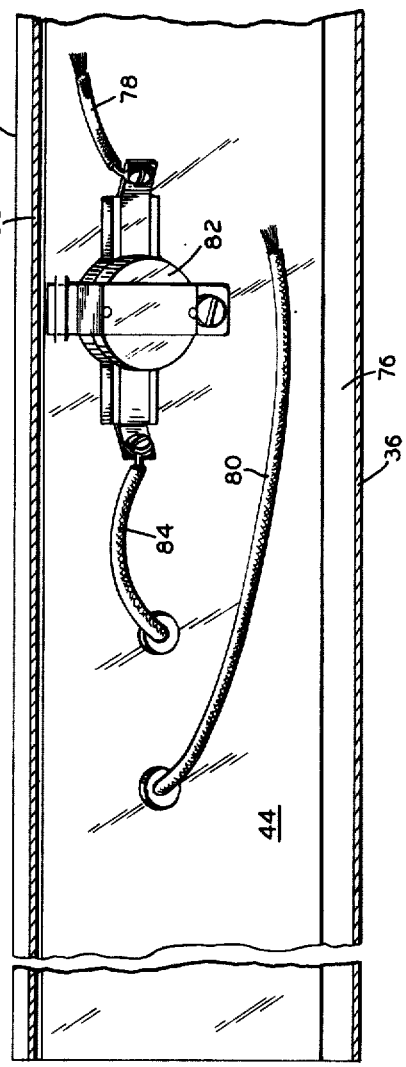
LOWELL R. MAST
INVENTOR.
BY
BLAIR, SPENCER & BUCKLES
ATTORNEYS.

United States Patent Office 3,084,240
Patented Apr. 2, 1963

3,084,240
ELECTRIC BASEBOARD HEATERS
Lowell R. Mast, East Rochester, N.Y., assignor to Commercial Controls Corporation, Electromode Division, Rochester, N.Y.
Filed Jan. 29, 1960, Ser. No. 5,423
8 Claims. (Cl. 219—34)

The present invention relates to baseboard heating units which may be serially joined in modular installations for heating rooms and enclosures, and more particularly to electrical baseboard heating units which may be easily and conveniently assembled in installation or reassembled in operating position with a minimum of labor.

In the fabrication of electric baseboard heaters a number of problems are encountered in producing a heater that will function efficiently and safely. It is of course very essential that the heating element be suspended in a freely flowing stream of air for maximum heat transfer and convection through the heater. The problems of directing air flow through the heater are also encountered in providing a baseboard heater which can be safely placed against a wall without the danger of fire from an overheated back panel of the heater. To prevent this overheating, a baffle arrangement is provided in the present invention with a separate insulating convection path adjacent the back portion of the heater housing. Passage of air through this convection path keeps the temperature of the back portion of the heater housing at a safe level. While providing a baseboard type heater having the proper air paths for maximum efficiency and safety, the expense of fabrication must also be kept to a minimum so that baseboard type electric heaters can effectively compete with other types of heating systems.

Further problems are also encountered in the installation of electric baseboard heaters. The problems of access to electrical connections, and the need of disassembly of the heating unit before installation and reassembly of the connected heating unit all result in an increase in installation cost. Problems of wiring accessibility, ease of disassembly and reassembly are also encountered in servicing and cleaning baseboard electric heaters.

Accordingly, it is a principal object of this invention to provide modular baseboard heating units which can be conveniently installed in operating position with a minimum of labor.

It is a further object of this invention to provide modular baseboard heaters of the above character adapted for use with electrical heating elements which can be installed conveniently in electrical circuits of the building or enclosure to be heated.

Another object of this invention is to provide electrical baseboard heater elements of the above character providing easily accessible and removable heater baffle assemblies.

Another object of this invention is to provide modular electrical heating elements of the above character which may be conveniently disassembled for installation and wiring and reassembled in operative condition in a minimum of time.

A still further object of this invention is to provide heating units of the above character which are economical to manufacture, install and maintain.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a better understanding of the nature and objects of the invention, reference should be had to the following detailed description taken in connection with the accompanying drawings, in which:

FIGURE 4 is a sectional end elevational view of the heating unit of the invention, taken along the line 4—4 in FIGURE 1;

FIGURE 5 is an enlarged fragmentary perspective view of the heating unit of the invention, partially disassembled during installation;

FIGURE 6 is a lateral sectional view of the heating unit shown in FIGURE 4, taken along the line 6—6 in FIGURE 4; and FIGURE 7 is a fragmentary sectional bottom view of the heating unit taken along the line 7—7 in FIGURE 4.

Similar reference characters refer to similar parts throughout the several views of the drawings.

To reduce the cost of installation and maintenance, the heating units of this invention greatly facilitate positioning of the heating element and baffles within the heater housing. As will be more fully described hereinafter the heating element and baffle members are constructed to be installed or removed from the housing as a single unit. Ease of installation of the heater-baffle assembly is further enhanced by the coaction of elements of the heater-baffle assembly and the housing.

Prior to installation, the heater-baffle assembly is positioned before the housing as shown in FIGURE 5. End brackets on the heater-baffle assembly, which also support the heating element, are provided with shoes at the outer end of each bracket. These shoes position the heater-baffle assembly at a predetermined height when laid face downward on the floor in front of the heater housing, as shown in FIGURE 5. Positioning at this height permits engagement of a locking flange and lip on the heater-baffle assembly with a base flange on the heater housing when the heater-baffle assembly is slid into the housing on the bracket shoes. Upward rotation of the heater-baffle assembly places the assembly in position to be secured to the housing, as will be more fully described hereinafter.

The center of gravity of the heater-baffle assembly is located well inside the base flange of the housing, upon which the assembly is pivoted into position. Due to the location of the center of gravity, the assembly, when upright within the housing, will remain in that position without being held. This permits a single workman to quickly and easily install the heating units of this invention. In repairing the heating units the heater-baffle assembly is easily removed, and upon reinstallation the heater may be tested in its normally installed, upright position before it is secured to the housing.

Figure 1:
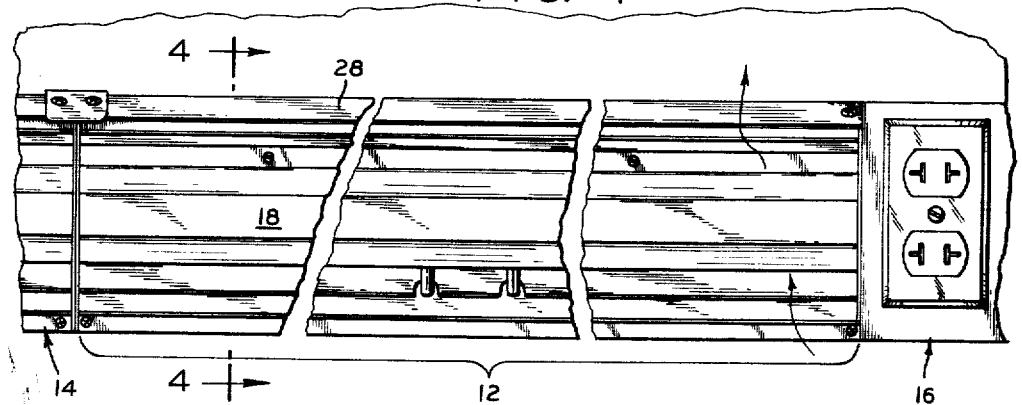
FIGURE 1 is a fragmentary front elevation of the heating units of the present invention serially installed in a modular installation in assembled condition.

The invention will now be described with more particularity. As shown in FIGURE 1 the baseboard heating unit 12 is modular in construction and when joined to a like adjacent unit 14 gives an appearance of continuity around the base of a room. An electrical outlet box generally indicated at 16 may also be located between heating units when desired. Removal of the front cover plate 18 exposes the heater element 20 (FIGURE 2), which may be of cast aluminum and is supported by a pair of brackets 22 secured to a baffle plate 42.

Referring now to FIGURES 4 and 5, it will be seen that the heater is enclosed on three sides by a housing generally indicated at 24 having a forwardly extending top flange 28, a vertical back portion 36, a forwardly extending base portion 32, and an upwardly extending base flange 30. The back portion 36 is provided with holes 34 for securing housing 24 in or against a wall or the like; it is also provided with boss projections 38 having openings 38a for securing the heater-baffle assembly generally indicated at 26 in position, as by screws 68. Also on the back portion 36 there is provided a knockout 40 for wiring.

As seen in FIGURES 4 and 5 the entire heater-baffle assembly 26 may be removed from the housing 24 by the removal of screws 68 from back portion 36; such removal is possible because of certain unique features of these heating units. More particularly the assembly includes a C-shaped baffle 42 to which a spaced, sloping ramp 44 is secured by straps 50 which may be welded to the ramp and secured to baffle 42 by screws 52. The ramp 44 is provided with a projecting lip 46 and a locking flange 48 extending from the lip. Lip 46 and flange 48 extend longitudinally for the length of the heater-baffle assembly. Also secured to the baffle 42 by screws 52 are a pair of end-brackets 22 which are provided with a slot 60 for receiving an end-bar 66 which is integral with the heating element 20. A spring clip 56 is secured to the bracket 22 and abuts end-bar 66. The end-bracket 22 is also provided with a pair of clips 58 for retaining the cover plate 18 (FIG. 4) in position. As seen in FIGURE 5 the end-brackets 22 are provided with an outturned shoe 54 upon which the heater-baffle assembly 26 rests when in a disassembled position.

The end-brackets 22 extend from the baffle 42 to such a distance that when the heater-baffle assembly 26 is placed on a substantially plane floor surface, resting on the shoes 54 in front of the housing 24, the locking flange 48 will just clear base flange 30 when the heater-baffle assembly is slid horizontally into engagement with the housing. The base flange will abut the projecting lip 46 and permit the heater-baffle assembly to be rotated upwardly and into the housing with the heater-baffle assembly resting on the lip 46, ramp extension 76 and boss 38.

Figure 2:
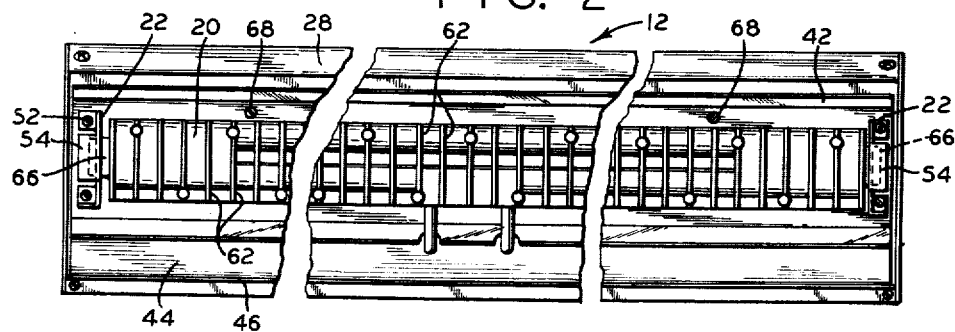
FIGURE 2 is a fragmentary front elevation of a single modular heating unit of the present invention, with the front cover plate removed to show the assembled position of the heater element.

The heater element 20 is provided with a plurality of integrally cast fins 62 for efficient heat distribution (FIGS. 2 and 6). Heat is generated by the electrical resistors 64 embedded in the solid cast eelment 20, as seen in FIGURE 4. The end-bar 66 of the heating element fits loosely into slots 60 of the end-brackets 22 permitting thermal expansion of the heater element.

The electrical connection for the heater is made through a pair of conducting cables 72 and 74 which are positioned in the space below ramp 44 which is closed off from the rest of the heater by ramp extension 76 abutting the back wall 36 of the housing. The connecting cables may run into the heater through knockout 40 (FIG. 5) or may continue from an adjacent heater. The conducting cables 72 and 74 are connected in parallel to leads 78 and 80, which are connected to the resistance elements 64 in the heating element 20. Also provided in this electrical circuit is a thermostatic circuit breaker 82 secured to the under side of ramp 44 (FIG. 7). One of the leads 78 to the resistive elements 64 passes through this thermostatic circuit breaker whereby, in the event of overheating current to the heating element though lead 84 is cut off.

Figure 3:
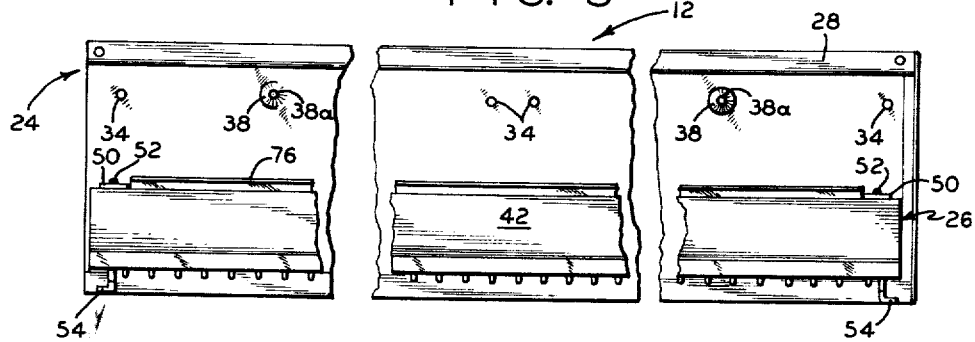
FIGURE 3 is a fragmentary front elevation of the modular heater unit of FIGURE 2 in its partly disassembled position prior to installation.

In installing the heater units around the periphery of a room, the housing 24 is first secured to the base of a wall by nails or screws through apertures 34 in the back portion 36 of the housing. The base portion 32 normally rests on the floor. The heater-baffle assembly 26 is then positioned in front of the housing and it is turned with its front side downward so that it rests on its bracket shoes 54 (FIGS. 3 and 5). Wires 78 and 80 are then connected to the conducting cables 72 and 74. With the electrical connections completed the heater is now ready for its final assembly. As best seen in FIGURE 5, the heater-baffle assembly 26 can slide on the shoes 54 and, when resting on the shoes, the locking flange 48 of the heater-baffle assembly will pass over the base flange 30 of the housing when the heater-baffle assembly is slid into position.

As the heater-baffle assembly is slid into position, the top of base flange 30 will contact the projecting lip 46 of the heater-baffle assembly. The assembly is then lifted and rotated about the base flange 30 into the installed position shown in FIGURE 4. The heater-baffle assembly will remain in this position without any other support, as its center of gravity is well inside the projecting base flange 30. The assembly then will rest upon the boss 38 and ramp extension 76. Two screws 68 (FIGS. 4 and 6) secure the assembly through aperture 70 (FIG. 5) as they are threaded into openings 38a. The installation is completed by hooking the cover plate 18 unto the notched end-brackets 22 and snapping the cover plate into secured position over spring clips 58.

If it is necessary to clean or service any part of the heater, it may be quickly disassembled by removal of the two screws 68, as downward rotation of the heater-baffle assembly 26 exposes the wiring and thermostatic circuit breaker 82. For reassembly the heater-baffle assembly 26 may be slid quickly into position to engage base flange 30, tipped upwardly and secured to the housing in a matter of seconds.

It will thus be seen from the foregoing description that such a baseboard heating unit is provided with the required multiple convection path both to insulate the wall adjacent housing 24 and also to provide an efficient transfer of heat from the heating element. Because of the locking co-operation between the locking flange and base flange of the housing, the unit is inexpensive in manufacture and can be easily and quickly installed or serviced. Because of this locking flange construction the wiring is also easily accessible, thus reducing the required installation time or servicing.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. In baseboard electric heaters, in combination, a housing including an upright back wall and a forwardly extending base portion having an upturned flange, a baffle assembly including a C-shaped member joined to a spaced lower ramp member, a heating element spaced forwardly of said C-shaped member, engaging means on the lower edge of said ramp member for engaging said upturned flange, a pair of spaced brackets secured to the back of C-shaped member, said brackets projecting forwardly a predetermined distance whereby said engaging means is positioned for sliding engagement with said upturned flange when said baffle assembly is faced downwardly and rests on said brackets.

2. A heater as defined in claim 1 wherein said heating element is provided with longitudinal projections and said brackets have means forming openings therein to receive said projections and to support said heating element.

3. In a baseboard electrical heater, in combination, a housing including a vertical back portion and forwardly-extending top and base portions, an upwardly extending flange integral with said base portion and spaced from said back portion, a longitudinal C-shaped baffle, a pair of forwardly extending brackets mounted on said baffle, a heating element supported by said brackets, an inclined ramp attached to said baffle and spaced from the lower portion thereof, said ramp being approximately the same length but wider than the lower portion of said baffle, a forwardly extending lip and downwardly extending locking flange integral with said ramp, and fastening means for securing the upper portion of said C-shaped baffle to said housing, whereby the lower portion of said C-shaped baffle is secured by the lip and locking flange engaging said base portion flange, and said ramp at its upper end abuts the back portion of said housing.

4. In a baseboard electrical heater, in combination, a housing having a vertical back portion with a forwardly projecting mounting boss portion formed therein, and forwardly extending top and base portions, an upwardly extending flange integral with said base portion spaced from said back portion, a heater-baffle assembly including a longitudinal C-shaped baffle, a pair of forwardly extending brackets mounted on said baffle, a heating element supported by said brackets, an inclined ramp attached to said baffle and having a ramp extension extending rearwardly to space said baffle from said vertical back portion when affixed thereto, and a forwardly extending lip with downwardly extending locking flange integral with said ramp, said heating element support brackets extending from said assembly a sufficient amount to permit engagement of said locking flange with the upwardly extending flange of said base portion when said heater-baffle assembly is resting on the plane of said base portion and when said heater baffle assembly is slid on said brackets to engage said locking flange with said base portion flange, and fastening means for securing the upper portion of said C-shaped baffle to said housing through said forwardly projecting boss whereby said C-shaped baffle is secured to said housing with a space between said housing and said baffle.

5. In a baseboard heater comprising, in combination, a housing including an upwardly extending base flange spaced from a vertical back portion, a heating element, baffle means including a downwardly extending locking flange positioned behind said base flange and a forwardly projecting lip resting on said base flange, and forwardly extending holders attached to said baffle means and supporting said heating element to provide a heater-baffle assembly, said holders extending forwardly a distance such that when said assembly is placed downwardly on a floor adjacent said housing resting on the forward edges of said holders, said locking flange clears said base flange and said lip engages the front edge of said base flange when the baffle means is slid into said housing.

6. A heater as defined in claim 5, wherein said heater-baffle assembly has a center of gravity inside of said housing when in an installed position, whereby said heater-baffle assembly may be retained in said housing by gravitational forces acting in conjunction with said locking flange and lip engaging said base flange and the part of said baffle means resting on said vertical back portion of said housing.

7. An improved electrical baseboard heater, comprising, in combination, a housing having spaced, forwardly extending top and bottom portions and a vertical back member integral therewith, said bottom portion including an upwardly extending base flange spaced from said back member, a heater-baffle assembly, horizontally extending baffle support means on the lower front edge of said assembly for pivotally supporting said assembly on said base flange, said baffle support means comprising a horizontally directed supporting surface resting on the upper surface of said base flange, forwardly extending members attached to said assembly and extending forwardly a distance such that when said assembly is placed downwardly on a floor adjacent said housing resting on the forward edges of said members with said supporting surface vertically oriented, said supporting surface is aligned with the upper edge of said base flange, whereby said assembly may be slid on said members until said supporting surface contacts the forward edge of said base flange, and pivoted upwardly and rearwardly into the assembled position.

8. The combination defined in claim 7 further comprising abutting means near the lower rear edge of said assembly for engaging a portion of said back member when said assembly is pivoted toward said back member to an assembled position, said assembly having a center of gravity above the rear of said base flange when in an assembled position.

References Cited in the file of this patent
UNITED STATES PATENTS

| | | |
|---|---|---|
| 1,664,171 | Hicks | Mar. 27, 1928 |
| 2,662,963 | Wessel | Dec. 15, 1953 |
| 2,799,763 | Hicks | July 16, 1957 |
| 2,899,529 | Calhoun | Aug. 11, 1959 |
| 2,954,456 | Calhoun et al. | Sept. 27, 1960 |

UNITED STATES PATENT OFFICE
CERTIFICATE OF CORRECTION

Patent No. 3,084,240  April 2, 1963

Lowell R. Mast

It is hereby certified that error appears in the above numbered patent requiring correction and that the said Letters Patent should read as corrected below.

Column 3, line 44, for "eelment" read -- element --; column 4, line 60, before "C-shaped" insert -- said --.

Signed and sealed this 29th day of October 1963.

(SEAL)
Attest:

ERNEST W. SWIDER
Attesting Officer

EDWIN L. REYNOLDS
Acting Commissioner of Patents